(12) United States Patent
Kim et al.

(10) Patent No.: US 8,964,138 B2
(45) Date of Patent: Feb. 24, 2015

(54) GLASS APPARATUS FOR WATCHING POLARIZED IMAGE

(71) Applicant: Samsung Electronics Co., Ltd., Suwon-si (KR)

(72) Inventors: Dae-sik Kim, Hwaseong-si (KR); Sergey Shestak, Suwon-si (KR); Do-young Kwag, Seoul (KR); Ho-seop Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 13/758,397

(22) Filed: Feb. 4, 2013

(65) Prior Publication Data

US 2013/0201416 A1  Aug. 8, 2013

Related U.S. Application Data

(60) Provisional application No. 61/600,166, filed on Feb. 17, 2012, provisional application No. 61/594,524, filed on Feb. 3, 2012.

(30) Foreign Application Priority Data

Jun. 4, 2012  (KR) .................. 10-2012-0059963

(51) Int. Cl.
*G02F 1/1335* (2006.01)
*G02F 1/13* (2006.01)
(Continued)

(52) U.S. Cl.
CPC .............. *G02F 1/1313* (2013.01); *G02B 27/26* (2013.01); *H04N 13/0033* (2013.01); *H04N 13/0434* (2013.01); *G02B 27/0093* (2013.01)
USPC .................. 349/15; 349/9; 349/96; 349/117

(58) Field of Classification Search
CPC ................... G02F 1/133528; G02F 1/133526; G02F 1/13363; G02F 1/133634; G02B 27/2214; G02B 27/26; G02B 5/3033; G02B 5/3083; H04N 13/80404; H04N 9/3197; H04N 9/3167; H04N 9/3105
USPC .......................... 349/15, 9, 96, 117
See application file for complete search history.

(56) References Cited

U.S. PATENT DOCUMENTS 6,252,624 B1 * 6/2001 Yuasa et al. .................. 348/56
2002/0122145 A1  9/2002 Tung
(Continued)

FOREIGN PATENT DOCUMENTS

KR  1020110082842 A  7/2011
KR  1020110086992 A  8/2011
(Continued)

OTHER PUBLICATIONS

International Search Report (PCT/ISA/210 & PCT/ISA/237) dated May 29, 2013 issued by the International Search Authority for International Application No. PCT/KR2013/000883.

*Primary Examiner* — Mike Qi
(74) *Attorney, Agent, or Firm* — Sughrue Mion, PLLC

(57) ABSTRACT

A glass apparatus for watching a polarized image is provided. The glass apparatus includes a film unit for double-refracting the polarized image when the glass apparatus is tilted; a sensor unit for detecting a slope of the glass apparatus based on a horizontal plane; a voltage driving unit for applying a driving voltage corresponding to the slope detected by the sensor unit, to a liquid crystal cell; the liquid crystal cell for switching an orientation according to the driving voltage, and changing polarization property of an image passing through the film unit according to the switched orientation; and a polarizer for polarizing the image passing through the liquid crystal cell in a preset polarization direction.

29 Claims, 18 Drawing Sheets

(51) Int. Cl.
*G02B 27/26* (2006.01)
*H04N 13/00* (2006.01)
*H04N 13/04* (2006.01)
*G02B 27/00* (2006.01)

(56) References Cited

U.S. PATENT DOCUMENTS

2005/0046617 A1  3/2005  Kurtzer et al.
2088/0129899    6/2008  Sharp

2011/0170185 A1  7/2011   Song et al.
2011/0248991 A1  10/2011  Park et al.
2011/0254931 A1  10/2011  Lee et al.

FOREIGN PATENT DOCUMENTS

| KR | 1020110107531 A | 10/2011 |
| KR | 1020110112575 A | 10/2011 |
| KR | 1020110133139 A | 12/2011 |
| KR | 1020120004855 A | 1/2012  |
| WO | 2011125462 A1  | 10/2011 |

* cited by examiner

GLASS APPARATUS FOR WATCHING POLARIZED IMAGE

CROSS-REFERENCE TO RELATED APPLICATIONS

This application claims priority from U.S. Provisional Application No. 61/594,524 filed on Feb. 3, 2012, U.S. Provisional Application No. 61/600,166 filed on Feb. 17, 2012, and Korean Patent Application No. 10-2012-0059963 filed on Jun. 4, 2012, in the Korean Intellectual Property Office, the entire disclosures of which are incorporated herein by reference.

BACKGROUND

1. Field

Apparatuses consistent with exemplary embodiments relate generally to a glass apparatus. More particularly, exemplary embodiments relate to a glass apparatus for watching a polarized image by effectively blocking flicker and crosstalk by compensating for a phase difference of the polarized birefringent image.

2. Description of the Related Art

Stereoscopic display technology is applied to various fields such as information communication, broadcasting, medical care, educational training, military, game, animation, virtual space, computer-aided design (CAD), and industrial technology, and is the core technology of next-generation 3D stereoscopic multimedia information communications, which is commonly required in those various fields.

In general, humans perceive relative depths complexly based on thickness change of eye lenses according to a location of an object to observe, an angle difference between both eyes and the object, location and shape differences of the object perceived by two eyes, parallax according to movement of the object, psychology, and memory effects.

Among the factors above, binocular disparity resulting from the horizontal separation of about 6-7 cm between two eyes of the human, is the most important factor in the stereoscopy. That is, the human sees the object with the angle difference because of the binocular disparity, the images input to the eyes have different images, and these two images are input to the brain through the retinas. The brain can create the original 3D stereoscopic vision by accurately uniting the two information.

Stereoscopic image display devices are categorized into a glass type using special glasses and a non-glass type without using special glasses. The glass type includes a color filter scheme which separates and selects the image using complementary color filters, a polarized filter scheme which separates left-eye and right-eye images by restricting the light using a combination of orthogonal polarizing elements, and a shutter glass scheme which creates illusion of the 3D image by alternately closing the left eye and the right eye in correspondence with a synchronization signal projecting a left-eye image signal and a right-eye image signal on a screen.

The polarized filter scheme alternately displays left-eye image data and right-eye image data on the horizontal line basis in a display panel and switches a polarization property incoming to polarizing glasses through a patterned retarder. Accordingly, the 3D image can be represented by spatially dividing the left-eye image and the right-eye image.

The polarized filter scheme features low crosstalk of the left eye and the right eye and high luminance in the 3D image. However, since the left-eye image and the right-eye image are spatially separated and displayed, the vertical resolution of the left-eye and right-eye images is halved in comparison with the physical vertical resolution of the panel.

The polarized filter scheme can be applied to not only the 3D image but also a multi-view environment where a plurality of viewers can watch different contents. In this case, a display device can represent a multi-view image by spatially separating the left-eye image and the right-eye image in the similar manner. Users watch different images through glass apparatuses corresponding to polarization directions of the multi-view image and having different polarization directions.

By contrast, according to the shutter glass scheme, the display device represents the 3D image by alternately displaying the left-eye image and the right-eye image on the frame basis, and opening and closing left-eye and right-eye shutters of the shutter glasses in synchronization with the display timing. The shutter glasses opens only the left-eye shutter during odd frames displaying the left-eye image, opens only the right-eye shutter during even frames displaying the right-eye image, and thus produces the binocular disparity based on the time division.

The shutter glass scheme can be applied to not only the 3D image but also the multi-view environment where the plurality of the viewers can watch different contents. In this case, the display device alternately displays one content and other contents, and opens and closes the left-eye and right-eye shutters of the shutter glasses in synchronization with the display timing so that the user wearing one glasses can watch only the corresponding content. Thus, several users can watch different contents.

The shutter glass scheme generally uses a liquid crystal shutter. The liquid crystal shutter opens or closes the shutters by changing orientation of the liquid crystal by applying an electrode to the liquid crystal.

The liquid crystal shutter glasses do not degrade the vertical resolution of the left-eye and right-eye images in the 3D image, but are subject to the low luminance of the 3D image because of the short data-on time of the liquid crystal shutter glasses and the 3D crosstalk according to synchronization of the display device and the liquid crystal shutter glasses and on-off switch response characteristics.

Preferably, the shutter glass scheme and the polarized filter scheme can be used together. In this case, the display device can alternately arrange and display the frames of the polarized left-eye image and right-eye image. The shutter on/off timing of the glasses is synchronized with the image frames alternately displayed by the display device. The glasses include a polarizer for passing the polarized image.

When the shutter glass scheme and the polarized filter scheme are used together, several users can watch different 3D contents. For example, one user can watch the horizontally polarized 3D content and another user can watch the vertically polarized 3D content at the same time. In this case, the glasses of each user include the polarizer having an orthogonal polarization axis.

In this example, the flicker is observed due to the difference of the lighting around the glasses and the shutter frequency, and a method for removing the flicker is required.

Also, when the user wearing the liquid crystal shutter glasses leans his/her neck, the glasses are tilted at a certain angle based on the horizontal plane. In this case, even when the glasses are closed, the crosstalk passes the image. Hence, it is necessary to prevent the crosstalk.

SUMMARY

Exemplary embodiments have been provided to address the above-mentioned and other problems and disadvantages occurring in the conventional arrangement, and an aspect of an exemplary embodiment provides a glass apparatus for watching a polarized image by removing flicker caused by the lighting and preventing crosstalk even when the glass apparatus is tilted.

According to an aspect of an exemplary embodiment, a glass apparatus for watching a polarized image includes a film unit which double-refracts the polarized image when the glass apparatus is tilted; a sensor which detects a slope of the glass apparatus based on a horizontal plane; a voltage driver which applies a first driving voltage corresponding to the slope detected by the sensor, to a liquid crystal cell; the liquid crystal cell, which switches a first orientation according to the first driving voltage, and changes a polarization property of an image passing through the film unit according to the switched orientation; and a polarizer which polarizes the birefringent image passing through the liquid crystal cell in a preset polarization direction.

When the glass apparatus is tilted, the film unit may convert linear polarization to one of circular polarization and elliptical polarization by double-refracting the polarized image.

When the glass apparatus is not tilted, the film unit may pass the polarized image without double refraction.

The film unit may be a retarder film of a quarter-wave film.

The film unit may convert a linearly polarized image into circular polarization when the glass apparatus is tilted 45 degrees based on a horizontal plane, and convert the linearly polarized image into elliptical polarization when the glass apparatus is tilted at an angle between 0 degree and 45 degrees based on the horizontal plane.

The birefringent image passing through the film unit may comprise a plurality of images, and a phase difference may exist between the plurality of the images.

The polarized image may be one of a 3-dimensional image, a multi-view image, and a 3-dimensional multi-view image.

The polarized image may be one of a left-eye image and a right-eye image, and the left-eye image and the right-eye image may have a same polarization direction.

The birefringent image passing through the film unit may comprise a plurality of images, and the liquid crystal cell may change a phase difference of the images by a first wavelength according to the first driving voltage.

The birefringent image passing through the film unit may comprise a plurality of images, and when the driving voltage is maximum, the first liquid crystal cell may not change a phase difference of the plurality of images.

When the first driving voltage is zero and the birefringent image passing through the film unit is left-circularly polarized, the liquid crystal cell may convert the left-circular polarization to a right-circular polarization. When the birefringent image passing through the film unit is right-circularly polarized, the first liquid crystal cell may convert the right-circular polarization to the left-circular polarization.

The glass apparatus may further include a second liquid crystal cell which switches a second orientation according to a second driving voltage, and changes polarization property of an image passing through the first liquid crystal cell according to the switched orientation, wherein the voltage driver generates and applies the second driving voltage to the second liquid crystal cell.

The image passing through the first liquid crystal cell may include a plurality of images, and the second liquid crystal cell may change a phase difference of the plurality of images by a wavelength according to the second driving voltage.

The image passing through the first liquid crystal cell may include a plurality of images. When the second driving voltage is zero, the second liquid crystal cell may change the phase difference of the second plurality of the images by ½ wavelength. When the second driving voltage is zero and the image passing through the second liquid crystal cell is circularly polarized, the second liquid crystal cell may reverse a direction of the circular polarization. When the second driving voltage is zero and the image passing through the liquid crystal cell is linearly polarized, the second liquid crystal cell may align a polarization direction of the image with a polarization axis of the polarizer.

The image passing through the second liquid crystal cell may include a plurality of images, and when the second driving voltage is maximum, the second liquid crystal cell may not change a phase difference of the plurality of images.

When the driving voltage is zero and the image passing through the first liquid crystal cell is left-circularly polarized, the second liquid crystal cell may convert the left-circular polarization to a right-circular polarization, and when the image passing through the first liquid crystal cell is right-circularly polarized, the second liquid crystal cell may convert the right-circular polarization to the left-circular polarization.

The glass apparatus may further include a controller which sets one of an open state and a closed state of the glass apparatus and controls the glass apparatus according to the open state and the closed state.

When the glass apparatus is opened, the voltage driver applies a first driving voltage to the liquid crystal cell according to a tilt of the glass apparatus so that a polarization direction of an image passing through the first liquid crystal cell is aligned with the polarizer. When the glass apparatus is closed, the voltage driver applies a first driving voltage to the first liquid crystal cell so that the polarization direction of the image passing through the first liquid crystal cell is vertical to the polarizer.

The liquid crystal cell may be one of a twisted nematic (TN) Electrically Controllable Birefringence (ECB) cell and a TN Optically Compensated Bend (OCB) cell.

The first wavelength may be preset.

According to another aspect of an exemplary embodiment, there is provided a glass apparatus. The glass apparatus comprises: a film unit which refracts an image when the glass apparatus is tilted; a sensor which detects a slope of the glass apparatus based on a tilted angle; a voltage driver which applies a driving voltage corresponding to the tilt angle detected by the sensor, to a liquid crystal cell; the first liquid crystal cell, which switches an orientation of the image according to the driving voltage, and changes a polarization property of the image according to the switched first orientation; and a polarizer which polarizes the image in a polarization direction.

When the glass apparatus is tilted, the film unit converts linear polarization to one of circular polarization and elliptical polarization by double-refracting the image.

When the glass apparatus is not tilted, the film unit passes the image without double refraction.

The film unit may be a retarder film of a quarter-wave film.

The image passing through the film unit may comprise a plurality of images, and a phase difference exists between the plurality of images.

The image may be one of a 3-dimensional image, a multi-view image, and a 3-dimensional multi-view image.

The image may be one of a left-eye image and a right-eye image, and the left-eye image and the right-eye image may have a same polarization direction.

As above, the glass apparatus of the exemplary embodiments can effectively block the flicker caused by the lighting and effectively remove the crosstalk.

BRIEF DESCRIPTION OF THE DRAWING FIGURES

These and/or other aspects of the exemplary embodiments will become apparent and more readily appreciated from the following description, taken in conjunction with the accompanying drawings of which:

DETAILED DESCRIPTION OF THE EXEMPLARY EMBODIMENTS

Figure 1:
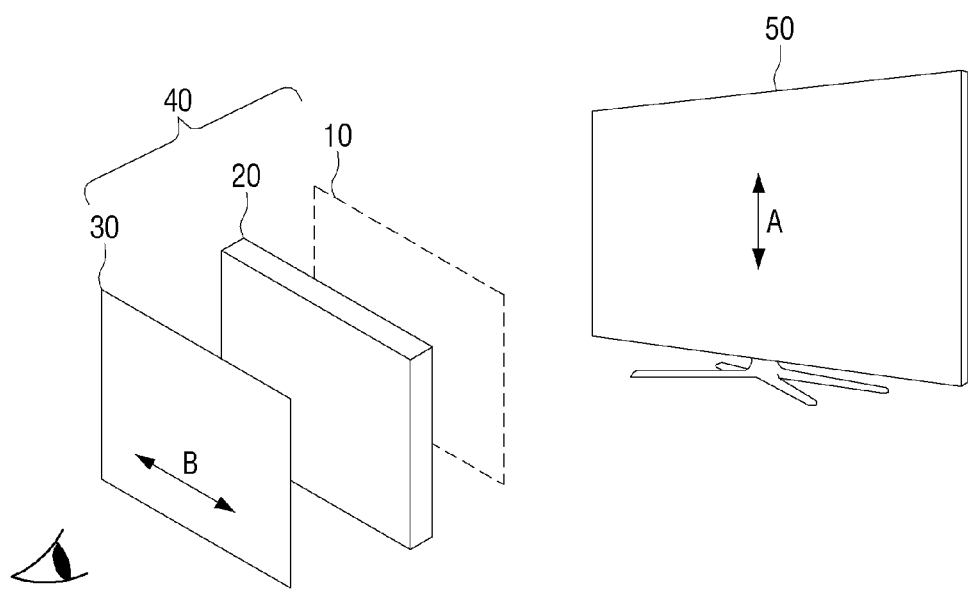
FIG. 1 is a conceptual diagram of a glass apparatus for removing flicker caused by the lighting and a display apparatus according to an exemplary embodiment.

Reference will now be made in detail to the exemplary embodiments, examples of which are illustrated in the accompanying drawings, wherein like reference numerals refer to the like elements throughout. The exemplary embodiments are described below by referring to the figures.

Figure 2:
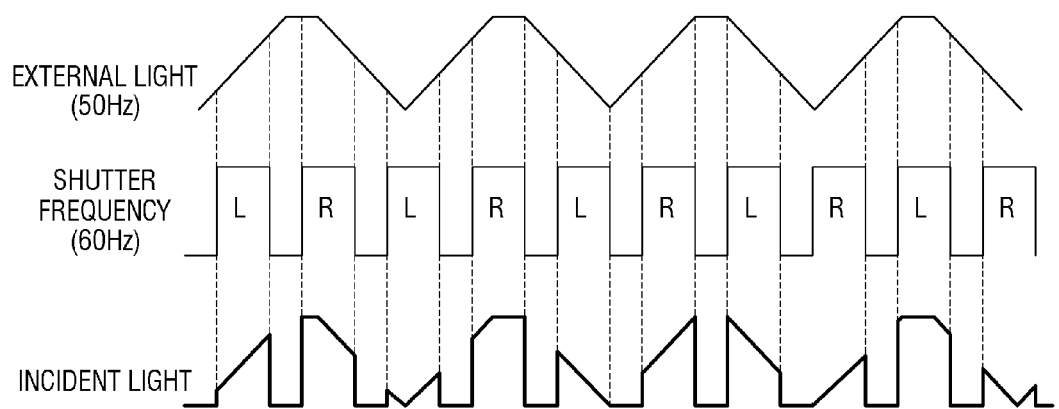
FIG. 2 is a diagram for illustrating a reason for the flicker caused by the lighting.

FIG. 1 is a conceptual diagram of a glass apparatus for removing flicker caused by the lighting and a display apparatus according to an exemplary embodiment, and FIG. 2 is a diagram for illustrating a reason for the flicker caused by the lighting.

As shown in FIG. 1, a system for watching a 3D polarized image includes a display apparatus 50 and a glass apparatus 40.

The display apparatus 50, which outputs an image, alternately outputs a left-eye image and a right-eye image constituting the 3D image. Each image is polarized and output in a particular direction, for example, in a horizontal direction or in a vertical direction. For doing so, the display apparatus 50 can further include a polarization panel (not shown). In general, a display apparatus for the stereoscopic image displays image frames at a frequency of 120 or 100 Hz. The glass apparatus, which is synchronized with the frequency, opens and closes its left-eye shutter and right-eye shutter for 60 or 50 times per second.

The glass apparatus 40, which allows watching the image polarized and output from the display apparatus 50, can include a front polarizer 10, a liquid crystal cell 20, and a rear polarizer 30.

The front polarizer 10 has a polarization axis in the same direction as the image polarized and output from the display apparatus 50, to pass the image. For example, the display apparatus 50 can output the image polarized in the horizontal direction. In this case, the polarizer 10 passes only the horizontally polarized image. By contrast, when the glass apparatus includes a polarizer which passes only the vertically polarized image, the glass apparatus cannot pass the horizontally polarized image. As such, a plurality of glass apparatuses each include a polarizer of the orthogonal polarization direction can be utilized in a multi-view environment where a plurality of users watches different contents.

The liquid crystal cell 20 switches its orientation according to a driving voltage, and changes the polarization property according to the switched orientation. The polarization property can be the phase or the direction of the polarization. That is, when the polarized image is incoming, a particular driving voltage is applied to the liquid crystal cell for the orientation and the liquid crystal cell 20 delays the wavelength of the incident light. For example, the liquid crystal cell can be an active retarder, and can change the polarization direction (the phase) of the linearly polarized image according to the particular voltage applied, or change the phase of the circularly polarized image to reverse the direction of the circular polarization. The polarization property is adequately changed so as to pass the incident light by opening the glass apparatus (the left eye or the right eye) or to block the incident light by closing the glass apparatus. For example, when no voltage is applied, the linear polarization can be rotated 90 degrees (change the phase difference by $\lambda/2$). When the voltage is applied, the incident light can be passed without any change.

The realization of the liquid crystal cell 20 is not limited to a particular technique, but can employ a TN Electrically Controllable Birefringence (ECB) cell or a TN Optically Compensated Bend (OCB) cell.

The rear polarizer 30 re-polarizes the image passing through the liquid crystal cell 20, and passes only the polarization component orthogonal to the output polarization of the display apparatus 50. Hence, when the shutter glass is opened, the polarized image of the display apparatus 50 should be able to pass through the rear polarizer 30 by manipulating the liquid crystal cell 20. Conversely, when the shutter glass is closed, the liquid crystal cell 20 needs to change the polarized output image of the display apparatus 50 to be vertical to the polarization axis of the rear polarizer 30.

When the glass apparatus 40 opens the shutter, the image vertically polarized and output from the display apparatus 50 passes through the front polarizer 10 and the liquid crystal cell 20 aligns the polarization direction with the polarization axis of the rear polarizer 30 as passing the image. Thus, the image passes through the glass apparatus 40 and forwarded to the human eye. By contrast, when the shutter is closed, the image vertically polarized and output from the display apparatus 50 passes through the front polarizer 10 and the liquid crystal cell 20 passes the image. As a result, the polarization direction is orthogonal to the rear polarizer 30 and thus the polarized image does not pass through the glass apparatus 40 and fails to reach the human eye.

However, flicker is observed due to the external lighting. The flicker is the image flickering to the human eye. The general flicker can be addressed by increasing the frequency of the image. When the orientation speed of the liquid crystal cell does not keep up with a high frequency, the high frequency causes crosstalk. Accordingly, the shutter glasses need to operate at an optimized rate. In general, when the luminance of the image is 50-100 cd/m2, the flicker is not observed. Yet, when a bright light source exists around the image, the flicker due to the lighting is observed, rather than the flicker of the image.

According to the observation, when the external lighting and the shutter frequency do not match as shown in FIG. 2, the flicker of the external lighting occurs because the external light is not completely input. The graph at the bottom in FIG. 2 shows the quantity of the incident light of the glass apparatus.

To address this, the front polarizer 10 of the glass apparatus 40 can be removed. Hence, exemplary embodiments provide shutter glasses without the front polarizer 10 so as to cancel the lighting flicker.

However, the mere removal of the front polarizer 10 can result in the crosstalk. The crosstalk is the leakage of other images when the light passes through the closed shutter glass. That is, when the right-eye shutter is opened and the left-eye shutter is closed, the right-eye image is fed to the left-eye shutter and thus the images are superimposed, or vice versa. In this case, the superimposed images are referred to as a ghost image. Since the crosstalk degrades the stereoscopic image watching and can further cause headache, it is recognized as an important problem to address in the stereoscopic display system.

The removal of the front polarizer 10 results in the crosstalk because the unpolarized external light is input together with the polarized image. In this case, as the unpolarized external light flows into the closed glass apparatus to deliver the image, it appears like the shutter glass apparatus is not correctly operating.

Figure 3:
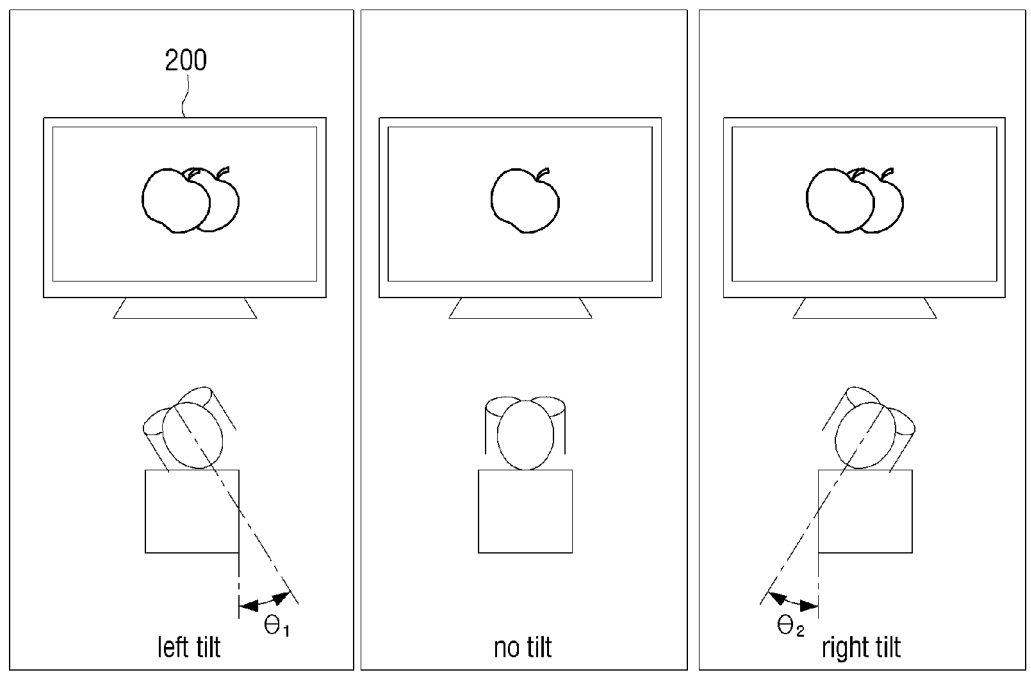
FIGS. 3A-3C are diagrams illustrating crosstalk due to tilt of the glass apparatus.

Further, even the polarized light can flow into the closed glass apparatus. For example, when a user wearing the glass apparatus leans their neck as shown in FIGS. 3A and 3C, the glass apparatus is tilted at a certain angle based on the horizontal plane. That is, to block the flow of the polarized light in a certain direction, a polarizer having the polarization axis vertical to the polarization direction is required. When the angle of the polarizer and the polarization direction derives from the verticality, the polarizer cannot completely block the polarized image. When the neck is tilted to the left by θ with respect to the vertical direction as shown in FIG. 3A or the neck is tilted to the right by θ with respect to the vertical direction as shown in FIG. 3C, the image is input and the ghost image is seen although the right-eye shutter is closed. As such, when the polarization direction, that is, the oscillating direction of the traveling light is not orthogonal to the polarization axis of the polarizer, the light flows because of the vector component of the electric field aligned with the polarization axis of the polarizer.

Figure 4:
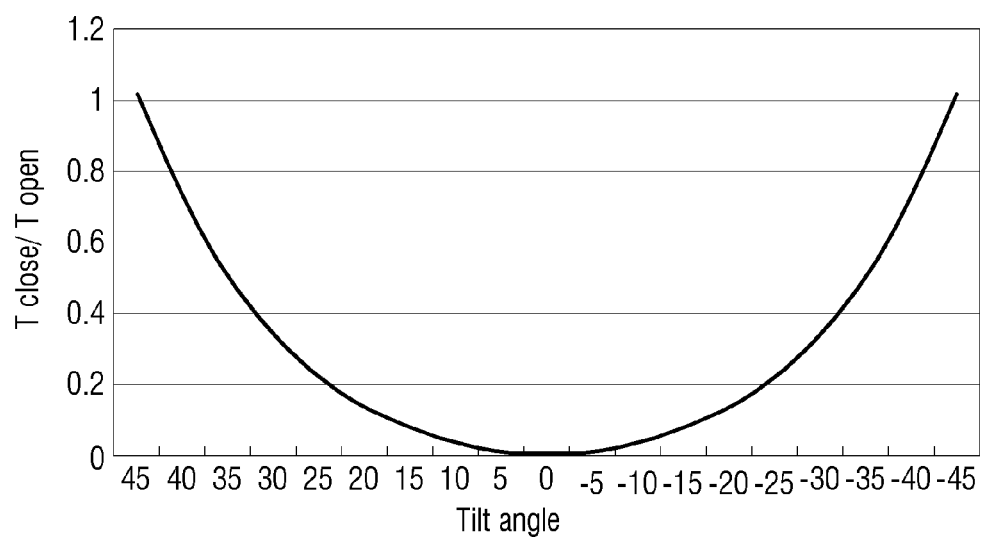
FIG. 4 is a graph for showing a relationship of the tilt of the glass apparatus and light transmissivity.

FIG. 4 is a graph for showing relationship of the tilt of the glass apparatus and the light transmissivity. A relative transmissivity is defined as a transmissivity rate when the glass apparatus is opened and closed, and corresponds to a contrast of the ghost image in the closed state. For example, when the relative transmissivity is zero, the closed glass apparatus does not pass the light. When the relative transmissivity is 1, it is like the open state. To limit the relative transmissivity from 0 to 0.05, the user can lean his/her head at only +12~−12 degrees, which may aggravate the user.

As mentioned above, the reason for the crosstalk varies and the crosstalk is rarely overcome merely by adjusting the shutter frequency. Considering this reason, it is necessary to block at least the external light incoming from the front surface of the glass apparatus and compensate for the light property change according to the tilt of the glass apparatus. The latter needs to minimize the relative transmissivity average of the light.

Now, a glass apparatus for addressing such a problem, that is, addressing the flicker of the lighting and minimizing the crosstalk at the same time, is explained.

Figure 5:
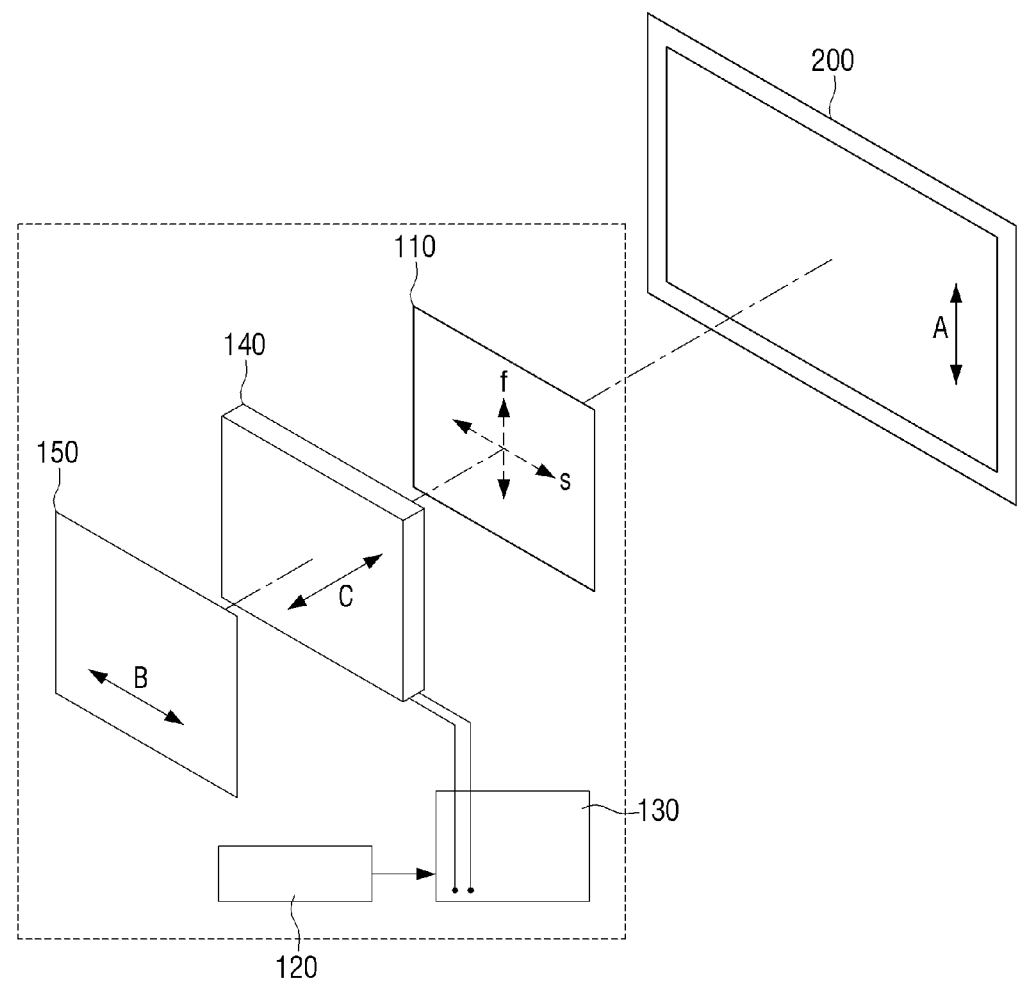
FIG. 5 is a conceptual diagram of a glass apparatus and a display apparatus according to an exemplary embodiment.
Figure 6:
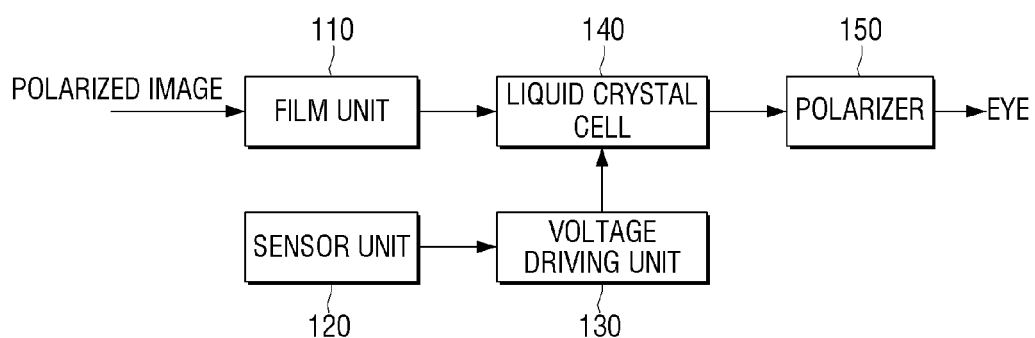
FIG. 6 is a block diagram of the glass apparatus of FIG. 5.

FIG. 5 is a conceptual diagram of a glass apparatus 100 and a display apparatus 200 according to various exemplary embodiments, and FIG. 6 is a block diagram of the glass apparatus 100 of FIG. 5.

Referring to FIGS. 5 and 6, a system for watching the polarized image according to various exemplary embodiments includes the display apparatus 200 and the glass apparatus 100.

The display apparatus 200 alternately displays the polarized images, and generates and transmits to the glass apparatus 100 a synchronization signal for synchronizing with the shutter on/off operation of the glass apparatus 100 corresponding to each image. The generation and transmission of the synchronization signal is not directly related to the present exemplary embodiment and thus shall be omitted here. The display apparatus 200 can be implemented using various devices including a display unit, such as TV, mobile phone, PDA, notebook PC, monitor, tablet PC, e-book, digital frame, and kiosk, and are not limited to a particular device. Yet, since a Liquid Crystal Display (LCD) or Organic Light Emitting Diode (OLED) display apparatus 200 generally includes a polarizer 150, the separate polarizer 150 is unnecessary. A polarization display panel (PDP) requires the separate polarizer 150.

The polarized image output from the display apparatus 200 can be any one of a 3-dimensional image, a multi-view image, and a 3-dimensional multi-view image. That is, the display apparatus 200 can alternately output 3-dimensional left-eye and right-eye images polarized in one direction, and may alternately output 2-dimensional multi-view images polarized in one direction to build the multi-view environment so that several users can watch different contents respectively. Also, the display apparatus 200 may realize the 3D multi-view environment by alternately outputting a pair of 3D left-eye images and another pair of left-eye images polarized in the horizontal direction and in the vertical direction respectively so that multiple users can watch different 3D contents.

The glass apparatus 100 turns on/off the left-eye and right-eye shutters in synchronization with the polarized image output of the display apparatus 200, and includes a film unit 110, a sensor unit 120, a voltage driving unit 130, a liquid crystal cell 140, and the polarizer 150.

According to various embodiments, the system can further include a controller (not shown) for setting the open and close status of the glass apparatus 100 and controlling the glass apparatus 100 according to the open and close status. Since the controller (not shown) controls the operations of the components, its explanation is replaced by the explanations on the operations of the components.

The film unit 110 is attached to the front side of the glass apparatus 100 and double-refracts the polarized image when the glass apparatus 100 is tilted. The film unit 110 can be, but is not limited to, a wave retarder. The wave retarder includes a fast axis and a low axis, and the birefringent image is converted to the polarization component corresponding to the fast axis and the low axis respectively and having a certain phase difference. For example, when the glass apparatus 100 is tilted, the film unit 110 can convert the linear polarization to the circular polarization or the elliptical polarization by double-refracting the polarized image.

Hereafter, a principle of the polarization property change as a result of the double refraction is described in brief.

The polarization state of the light, which is the vector, can be obtained by expressing the electric field of the light as a function of the space time. The electric field of the light traveling in the z direction has two components x and y. The two components of the light with a frequency ω can be expressed as:

$$E_x = E_{x0} \sin(kz - \omega t + \delta_1)$$

$$E_y = E_{y0} \sin(kz - \omega t + \delta_2).$$  <Equation 1>

This wave of the x-direction amplitude $E_{x0}$ and the wave of the y amplitude $E_{y0}$ are synthesized with the same phase. When the phases $\delta_1$ and $\delta_2$ of the two waves are identical, the propagation direction of the wave does not change though the wave propagates with the angle $E_{x0}/E_{y0}$ to the x axis. This polarization is the linear polarization.

Figure 7:
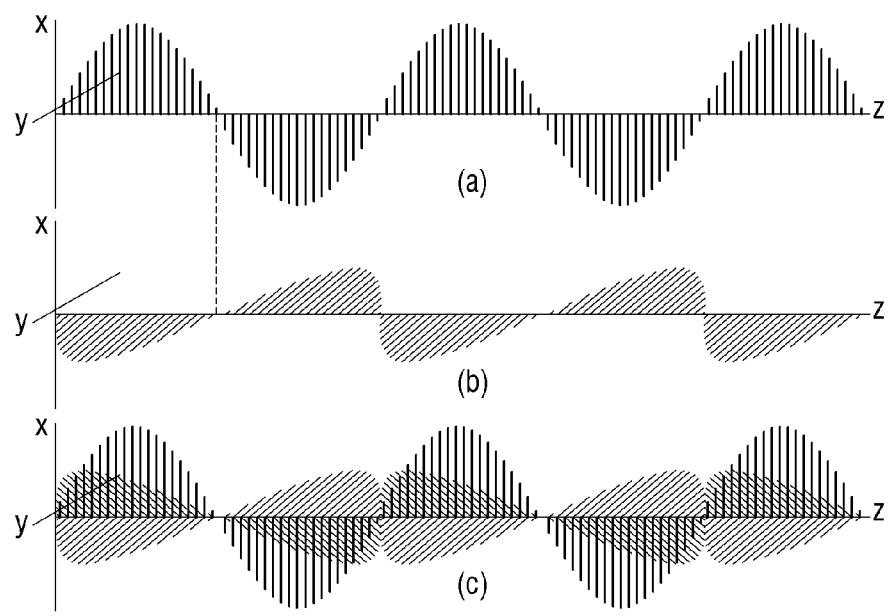
FIG. 7 is a conceptual diagram of propagation components of the birefringent light linearly polarized.

The linear polarization is more clarified in FIG. 7. The x polarized wave and the y polarized wave travel in the z direction with the same amplitude and the same phase. The highest light is referred to as an x-polarization because its electric field oscillates only along the x axis, and the next graph is referred to as a y-polarization because it oscillates along the y axis. The last graph combines the two graphs, and the electric field is 45 degrees off the x and does not change its direction during the propagation. The linear polarization indicates such no change of the oscillating surface. The electric field at one point vibrates like simple harmonic motion.

Figure 8:
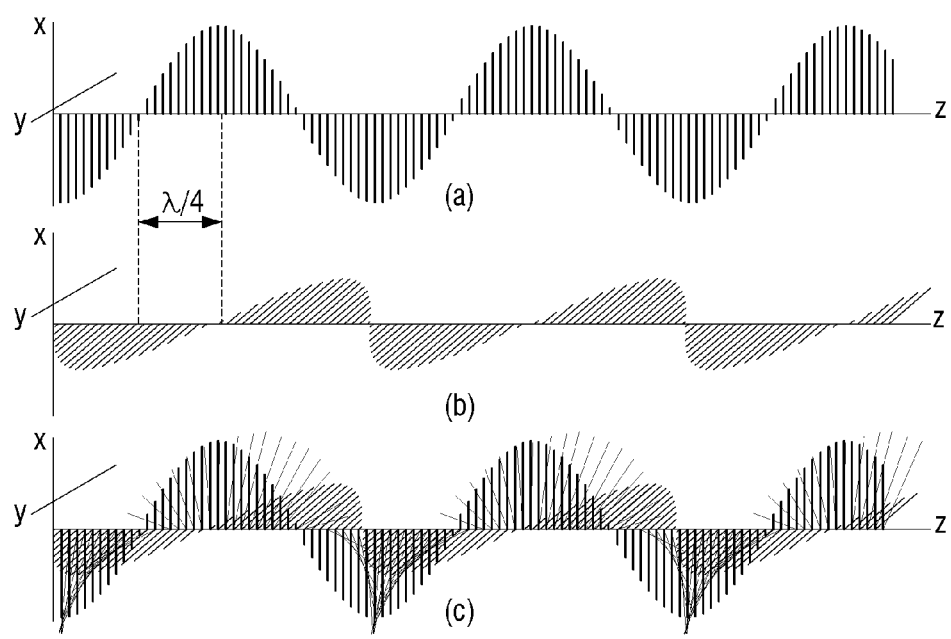
FIG. 8 is a conceptual diagram of propagation components of the birefringent light circularly polarized.

However, when the phases of the x polarization and the y polarization are misaligned, the direction of the electric field rotates according to the propagation. This polarization is referred to as the elliptical polarization. When $E_x$ and $E_y$ are the same and the phase difference is λ/4 in the elliptical polarization, the electric field describes a helix in the z direction, which is referred to as the circular polarization (see FIG. 8).

In most cases, the lights produced from the light source include many polarized lights. In this case, the phases $\delta_1$ and $\delta_2$ are not correlated and have random values.

Meanwhile, when the light is reflected or scattered by an object, the level of the reflection or the scattering differs according to the polarization direction and thus the polarization state can change. This is why the obliquely reflected light or the blue light of the sky is partially polarized. There exists a material having the light propagation speed varying according to the polarization state. This is referred to as birefringence and such a material is referred to as a birefringent material.

An optical device for absorbing the light oscillating in a particular direction and passing only the component polarized in the vertical direction of the particular direction is referred to as the polarizer 150, and its polarization direction passed is referred to as the polarization axis. When the light expressed in Equation 1 is passed with the polarization axis in the x direction, only the x-polarized light passes. When the light of the amplitude $E_0$ linearly polarized in a certain direction passes through the polarizer 150 with the polarization axis tilted at θ, the linearly polarized light of the amplitude $E_0$ cos θ and the inclined polarization direction is passed. At this time, when the intensity of the incident light is $I_0$, the intensity of the transmitted light is expressed as:

$$I = I_0 \cos^2 \theta.$$  <Equation 2>

An example of the birefringent material includes a calcite, a mica, etc. The light traveling along an optical axis in a double-refracting crystal has the same propagation speed $c_0$ regardless of the polarization direction. The light traveling in other directions has two speeds. In particular, the light traveling in the vertical direction of the optical axis has the greatest difference of the two speeds. That is, while the ordinary wave polarized vertically to the optical axis also has the speed $c_0$, the extraordinary wave of the optical axis direction can be expressed as a speed $c_e$.

Figure 9:
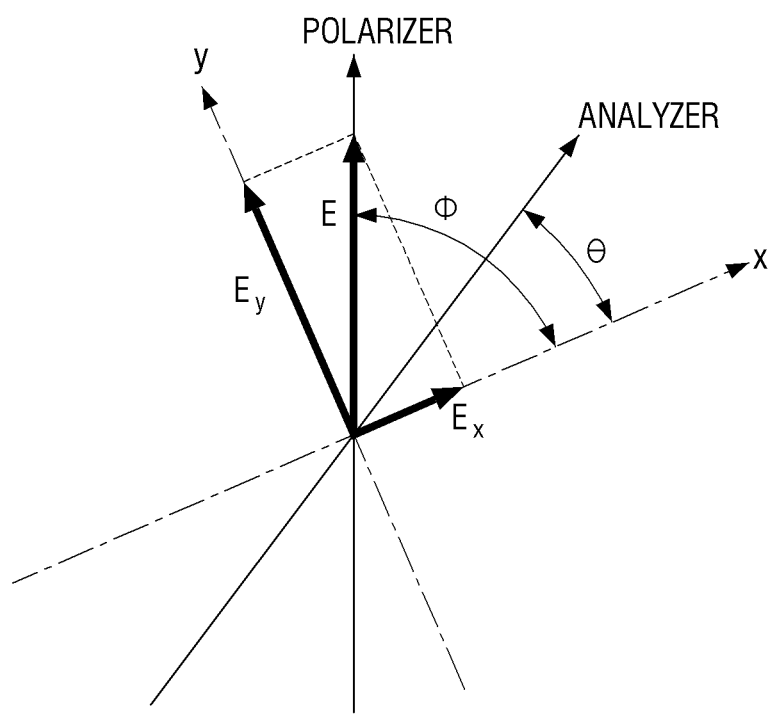
FIG. 9 is a diagram of a vector component of the birefringent incident light.

Referring to FIG. 9, the unpolarized light passes through the polarizer which is tilted at ϕ with respect to the x axis and then passes through the birefringent material having the optical axis in the x direction and the thickness of d. When an inclined analyzer (the polarizer 150 for checking the polarization state) is disposed after the birefringent material in order to analyze the polarization state of the light, the x and y components of the incident light of the birefringent material are expressed as:

$$E_x = E \sin \phi \cdot \sin(\omega t)$$

$$E_y = E \cos \phi \cdot \sin(\omega x).$$  <Equation 3>

Since the two waves pass through the crystal of the thickness d at different propagation speeds, their phase difference generates. The phase difference is expressed as:

$$\delta = \omega(d/c_0 - d/c_e)$$
$$= \omega/c(n_0 - n_e)d$$
$$= 2\pi/\lambda(n_0 - n_e)d$$  <Equation 4>

$n_0$, $n_e$: transmissivity for two speeds, λ: wavelength in the vacuum

Given the phase difference π/2 by adequately setting the thickness of the birefringent material, the vector component of the electric field becomes the elliptical polarization expressed as:

$$E_x = E \sin\varphi \cdot \sin(\omega t + \alpha)$$
$$E_y = E \cos\varphi \cdot \sin(\omega t + \alpha + \pi/2)$$
$$= E \cos\varphi \cdot \sin(\omega t + \alpha).$$  <Equation 5>

When ϕ is π/4 and thus $E_x$ and $E_y$ has the identical size, the complete circular polarization is realized, which is referred to as a ¼ wave film. Meanwhile, when the wave difference is set to λ/2, the y component becomes minus, which is referred to as a ½ wave film. That is, the optical axis rotates at 90 degrees, which can be implemented by stacking two ¼ wave films.

The structure of the glass apparatus 100 is explained.

The sensor unit 120 detects the slope of the glass apparatus 100 based on the horizontal plane. In detail, the sensor unit 120 detects the slope of the glass apparatus 100 based on the horizontal plane and provides the slope to the controller (not shown) or the voltage driving unit 130. The slope can be detected based on the change of resistance, electrostatic capacity, or inductance.

The voltage driving unit 130 applies the driving voltage corresponding to the slope detected by the sensor unit 120, to the liquid crystal cell 140. Since the liquid crystal cell 140 changes the property of the polarization by switching the orientation of the liquid crystal according to the applied voltage (to be explained) the voltage driving unit 130 generates and applies the adequate voltage to the liquid crystal cell 140 according to the property of the aimed polarization.

The liquid crystal cell 140 switches the orientation according to the driving voltage and changes the polarization property according to the switched orientation. The property of the polarization can be the phase or the direction of the polarization. That is, when the polarized image is input and a particular driving voltage is applied to the liquid crystal cell 140 for the orientation, the liquid crystal cell 140 can perform the similar function to the wave retarder. Thus, the liquid crystal cell 140 can change the phase difference of the multiple images based on a preset wave according to the driving voltage. For example, the liquid crystal cell 140 can change the polarization direction (rotate the optical axis) of the linearly polarized image according to the particular voltage applied from the voltage driving unit, or reverse the direction of the circular polarization by changing the phase of the circular polarization. The property of the polarization is adequately changed in order to pass the incident light by opening the glass apparatus 100 (the left eye or the right eye) or to block the incident light by closing the glass apparatus 100. For example, when no voltage is applied, the linear polarization can be rotated 90 degrees. When a particular voltage is applied, the incident light can be passed as it is.

The polarizer 150 absorbs the light oscillating in a particular direction and thus passes only the component polarized in the vertical direction as mentioned earlier. In detail, the polarizer 150 polarizes the image passing through the liquid crystal cell 140 in a preset polarization direction. The incident light passes only the polarization component of the oscillating direction aligned with the polarization axis and absorbs other optical components. When the glass apparatus 100 is not tilted, the polarizer 150 has the polarization direction orthogonal to the image polarized and output from the display apparatus 200.

Hereafter, an exemplary embodiment is described by referring to FIGS. 10 and 11. FIGS. 10 and 11 depict the polarization property of the image passing through the display apparatus 200, the film unit 110, the liquid crystal cell 140, and the polarizer 150 when the glass apparatus 100 is opened or closed. Herein, the film unit 110 employs a retarder film which is the quarter-wave film.

When the glass apparatus 100 is not tilted as shown in the center image FIG. 3B, the film unit 110 does not apply the double refraction. In this case, the two axes (the fast axis and the slow axis) of the film unit 110 are aligned with the polarization directions of a polarizer of the display apparatus 200 and the polarizer 150 of the glass apparatus 100.

Figure 10A:
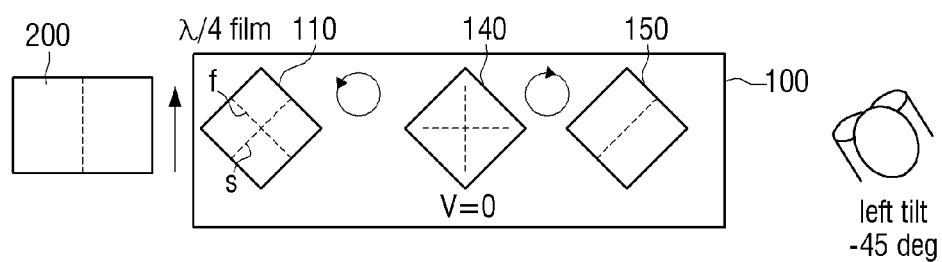
FIGS. 10A and 10B are diagrams illustrating changes of polarization property when the glass apparatus is opened and tilted according to an exemplary embodiment.
Figure 10B:
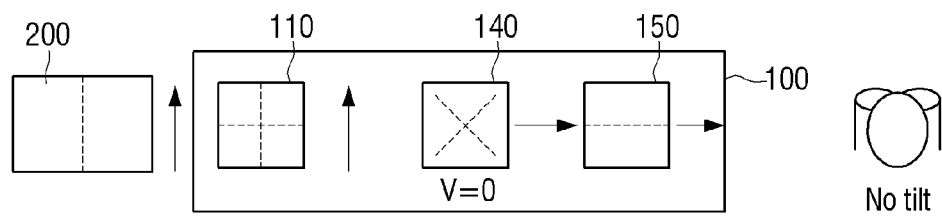

FIG. 10B shows no property change of the light passing through the film unit 110. At this time, the voltage driving unit 130 applies no voltage to the liquid crystal cell 140. When the liquid crystal cell 140 is implemented using, but not limited to, a twist TN cell and the applied voltage is zero, the incident light is rotated by the twisting of liquid crystal molecules and the polarization direction is changed by 90 degrees. That is, when the incident light is linearly polarized, the polarization direction is rotated 90 degrees. When the incident light is left-circularly polarized, the polarization direction is changed to the right-circular polarization. The right-circular polarization is changed to the left-circular polarization. As a result, the incident light vertically polarized in FIG. 10B passes through the liquid crystal cell 140 with the horizontal polarization component. The polarizer 150, which has the polarization axis in the horizontal direction, passes the polarized image and the user can watch the polarized image.

FIG. 10A shows the property change of the polarized light when the glass apparatus 100 is tilted −45 degrees from the horizontal plane due to the user leaning the neck. The film unit 110 generates the phase difference of λ/4 by double-refracting the polarized image passing through the display apparatus 200. In this case, since the horizontal component and the vertical component of the electric field have the same intensity, the polarization is the circular polarization creating the helix. Since the liquid crystal cell 140 does not apply the voltage and rotates 90 degrees as stated above, the reverse circular polarization is output. Since the circular polarization progresses as creating the helix, the image is passed on to the eye via the polarizer 150 regardless of the polarization axis of the polarizer 150. Meanwhile, when the glass apparatus 100 is tilted 0-45 degrees with respect to the horizontal plane, the vertical polarization and the horizontal polarization of the birefringent image are different and thus the incident light of the linear polarization becomes the elliptical polarization.

Figure 11A:
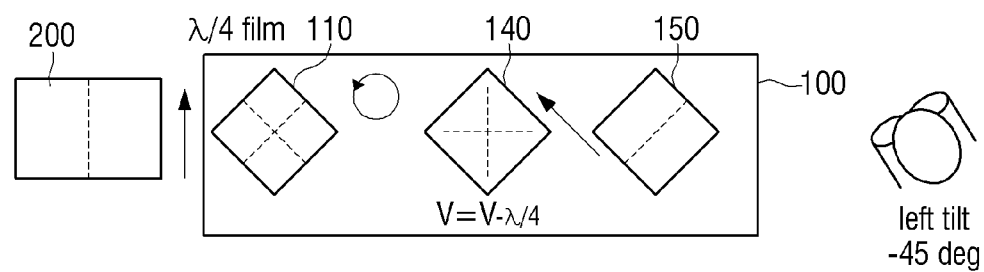
FIGS. 11A and 11B are diagrams illustrating changes of the polarization property when the glass apparatus is closed and tilted according to an embodiment of the present general inventive concept.

FIG. 11A shows the property change of the polarized light when the glass apparatus 100 is closed and tilted −45 degrees from the horizontal plane due to the user leaning the neck. Similarly, the film unit 110 generates the phase difference of λ/4 by double-refracting the polarized image passing through the display apparatus 200. Likewise, since the horizontal component and the vertical component of the electric field have the same intensity, the polarization is the circular polarization creating the helix. Herein, the liquid crystal cell 140 alters the orientation of the liquid crystal by applying a particular voltage, and restores the phase difference λ/4 of the incident light to zero by operating as the retarder film of −λ/4. As a result, the circular polarization is converted back to the linear polarization, and the image linearly polarized in the orthogonal direction of the polarization axis of the polarizer 150 is output. Since the entire incident light from the external lighting is absorbed, the image having the polarization component orthogonal to the polarizer 150 cannot pass through the polarizer 150. Hence, the image is not seen in the closed state to address the crosstalk, and the lighting flicker does not occur because the unpolarized external light is not input.

Figure 11B:
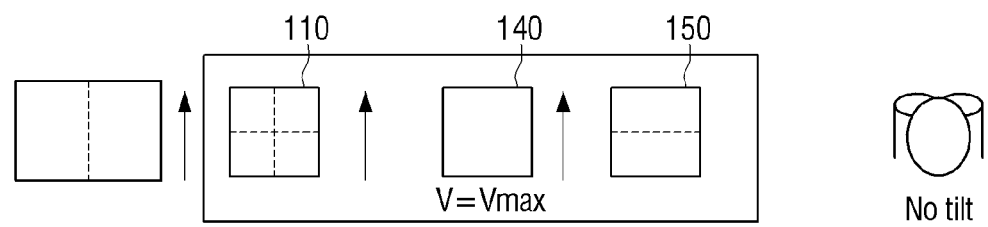

FIG. 11B depicts the polarization property when the glass apparatus 100 is not tilted. In this case, the film unit 110 does not apply the double refraction to the incident light as mentioned above. At this time, a maximum driving voltage can be applied to the liquid crystal cell 140. In this case, the liquid crystal cell 140 acts as an optically isotropic body. As a result, the incident light is output without any influence, and the output image, which has the polarization component orthogonal to the polarization axis of the polarizer 150, cannot pass through the glass apparatus 100 in the end. The crosstalk does not occur either.

Figure 12:
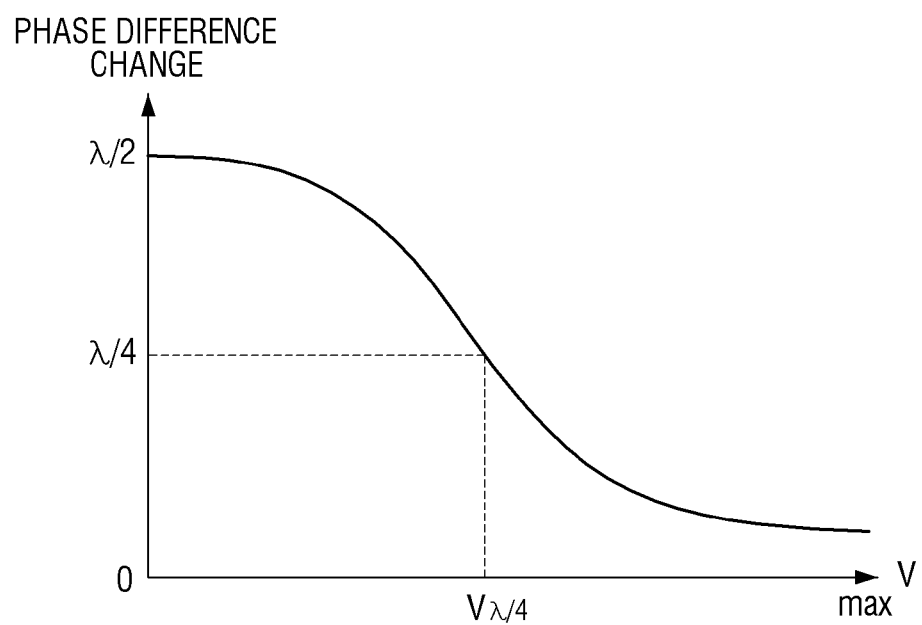
FIG. 12 is a graph of the applied voltage and a phase difference change of a liquid crystal cell.

FIG. 12 is a graph of the applied voltage and the phase difference change of the liquid crystal cell 140.

As shown in FIG. 12, when the applied voltage increases, the liquid crystal cell 140 operates as the optically isotropic body not affecting the phase difference change of the incident light. However, when the applied voltage is input with a preset voltage corresponding to λ/4, the liquid crystal cell 140 operates as a λ/4 retarder film. When the applied voltage is not input, the liquid crystal cell 140 operates like a λ/2 retarder film.

Figure 13:
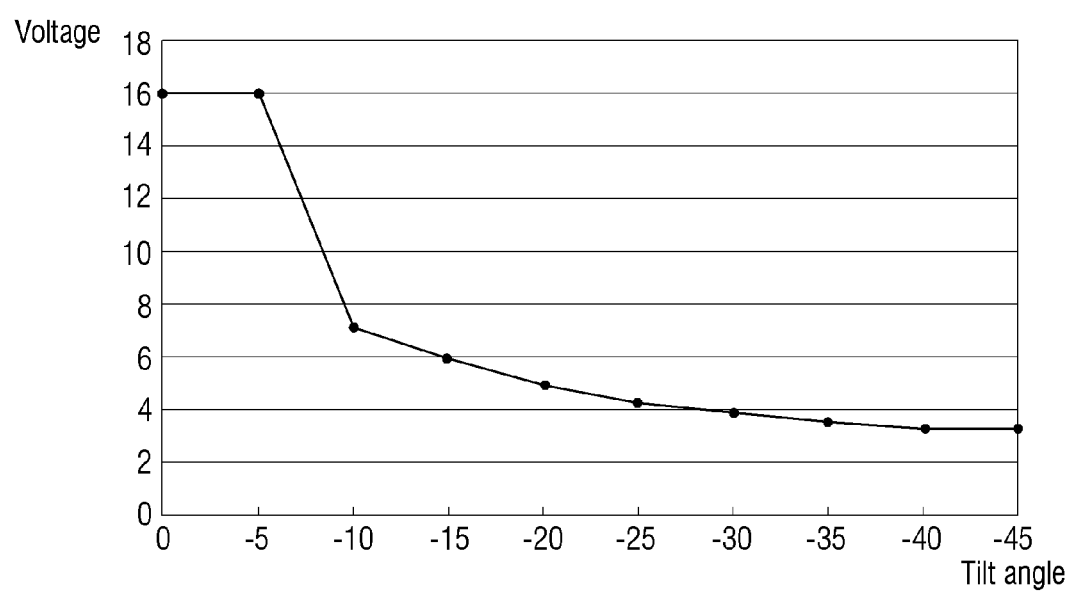
FIG. 13 is a graph of relationship of the tilt angle and the applied voltage of the glass apparatus.

FIG. 13 is a graph showing relationship of the tilt angle and the applied voltage of the glass apparatus 100.

As shown in FIG. 13, as the tilt angle increases, the applied voltage reduces. A person skill in the art shall appreciate that this characteristic can vary according to the property of the liquid crystal cell 140.

Figure 14:
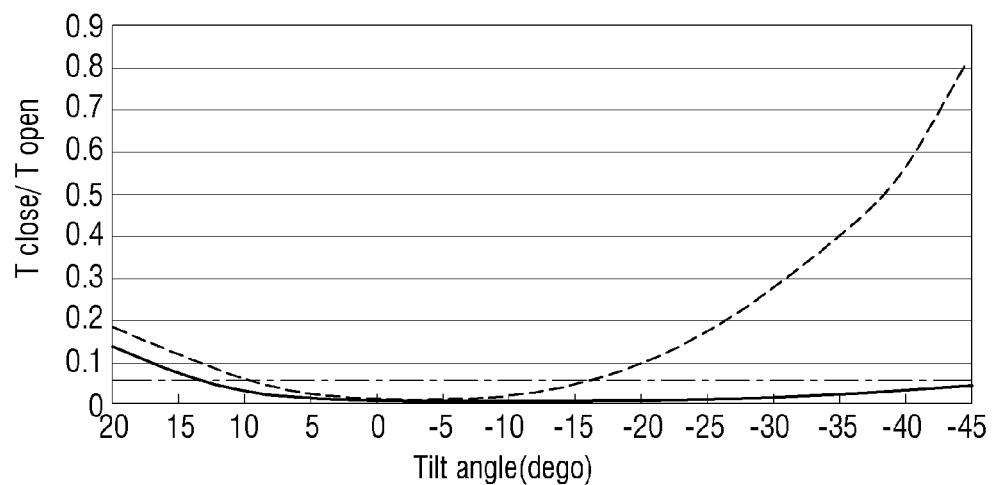
FIG. 14 is a graph of the relative transmissivity of the incident light according to various exemplary embodiments.

The exemplary embodiments address the crosstalk problem. FIG. 14 is a graph showing the relative transmissivity of the incident light according to various exemplary embodiments. The dotted line indicates the relative transmissivity of FIG. 4, and the solid line indicates the relative transmissivity according to the aforementioned exemplary embodiment. A ghost image level of 5% ranges from +13 degrees to −45 degrees. Hence, when the filter unit of the glass apparatus 100 and the polarizer 150 are tilted −16 degrees, the free tilt of +−26 degrees equally to the left and to the right is available. It is also necessary to design the liquid crystal cell 140 to tilt or to incline the rubbing direction.

A next example can be further considered so that the user can move more freely without the crosstalk, which is explained by referring to FIGS. 15 through 18.

Figure 15:
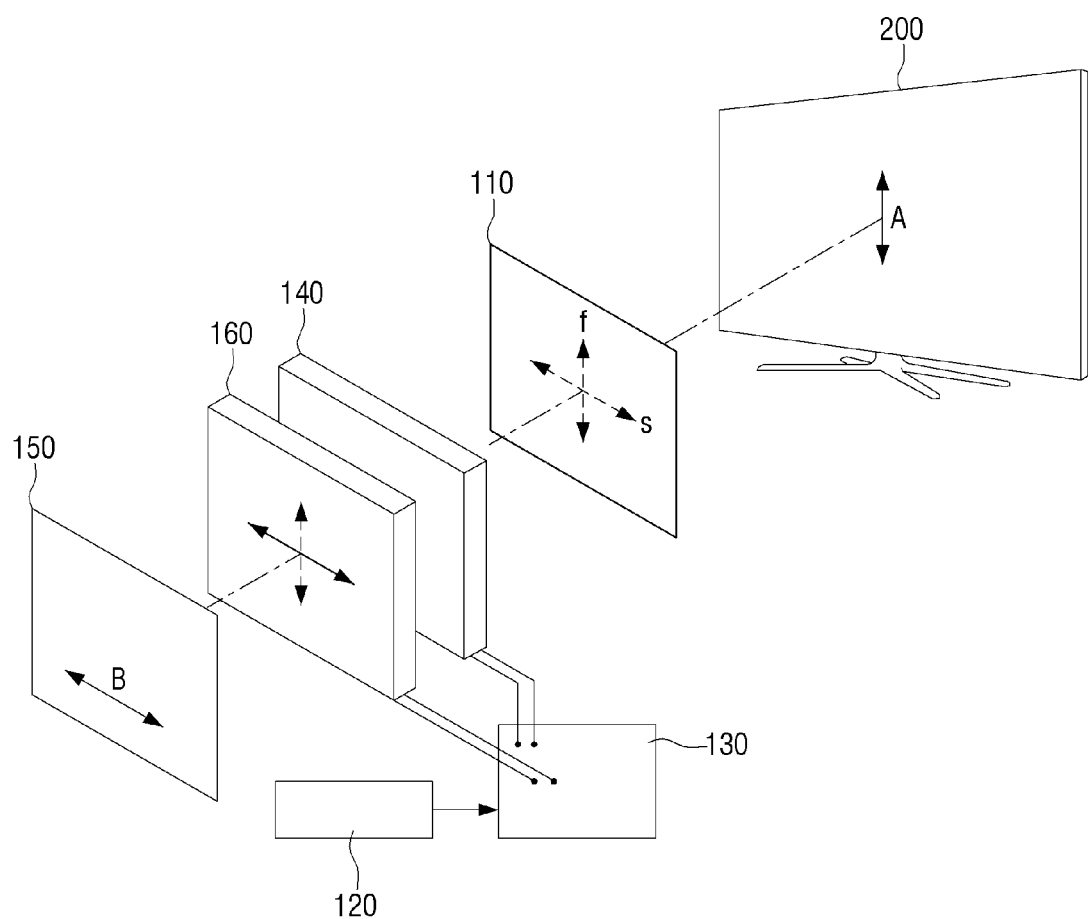
FIG. 15 is a conceptual diagram of the glass apparatus and the display apparatus according to another exemplary embodiment.
Figure 16:
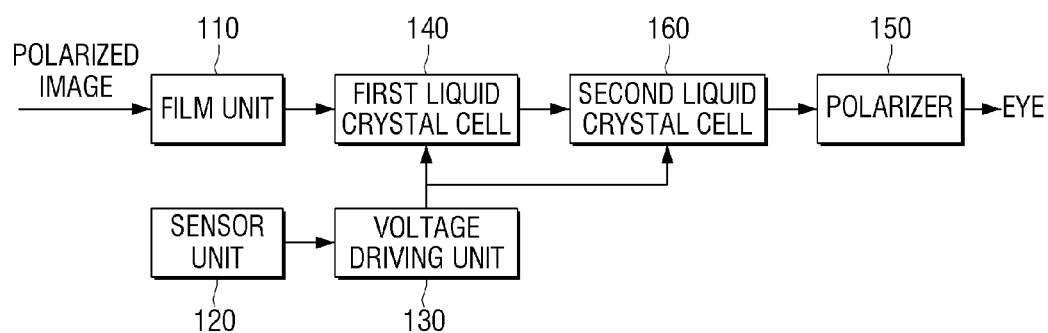
FIG. 16 is a block diagram of the glass apparatus of FIG. 15.

Referring to FIGS. 15 through 16, the glass apparatus 100 according to various exemplary embodiments includes a film unit 110 for double-refracting the polarized image when the glass apparatus 100 is tilted, a sensor unit 120 for detecting the slope of the glass apparatus 100 based on the horizontal plane, a voltage driving unit 130 for applying the driving voltage corresponding to the slope detected by the sensor unit 120 to a liquid crystal cell 140, the liquid crystal cell 140 for switching the orientation according to the driving voltage and changing the polarization property of the image passing through the film unit 110 according to the switched orientation, a second liquid crystal cell 160 for switching the orientation according to a second driving voltage and changing the polarization property of the image passing through the liquid crystal cell 140 according to the switched orientation, and a polarizer 150 for polarizing the image passing through the second liquid crystal cell 160 in a preset polarization direction.

The film unit 110, the sensor unit 120, the voltage driving unit 130, the liquid crystal cell 140, and the polarizer 150 are the same as those in the aforementioned exemplary embodiment and their explanations shall be omitted.

The second liquid crystal cell 160 changes the phase difference of a plurality of images by a preset wavelength according to the second driving voltage. Basic operations of the second liquid crystal cell 160 are the same as the aforementioned liquid crystal cell (the first liquid crystal cell 140). The voltage driving unit 130 as mentioned above can generate and apply the second driving voltage to the second liquid crystal cell 160, or a separate voltage driving means may generate and apply the second driving voltage to the second liquid crystal cell 160.

The glass apparatus 100 including the single liquid crystal cell 140 as stated earlier efficiently blocks the crosstalk when the glass apparatus 100 is tilted to the left. However, when the glass apparatus 100 is tilted to the right, some problems occur. It is assumed that the glass apparatus 100 including only the single liquid crystal cell 140 is tilted to the right. In this case, when the vertically polarized image is output through the display apparatus 200, the fast axis of the film unit 110 is tilted to the right and forms +45 degrees to the right with the vertically polarized image. Thus, the circular polarization in the opposite direction from FIG. 10 is generated. That is, when the λ/4 retarder film is used, the phase difference of the birefringent image becomes 3λ/4(λ/4+λ/2), rather than λ/4. Accordingly, to output the linear polarization, the liquid crystal cell 140 needs to compensate for 3λ/4, not λ/4. However, since the voltage is applied to the liquid crystal cell 140 to limit the switching speed of the liquid crystal orientation, the incident light may not be completely blocked in a moment. As a result, the crosstalk may not be perfectly cancelled.

An exemplary embodiment including the second liquid crystal cell 160 can address such a problem, which is explained in FIGS. 17 and 18.

Figure 17A:
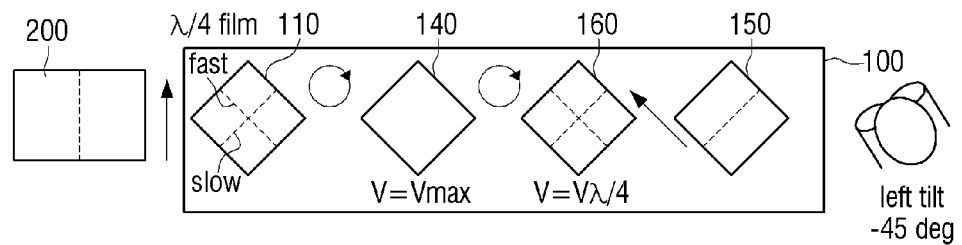
FIGS. 17A-17C are diagrams illustrating the polarization property change when the glass apparatus of FIG. 15 is closed and tilted.
Figure 17B:
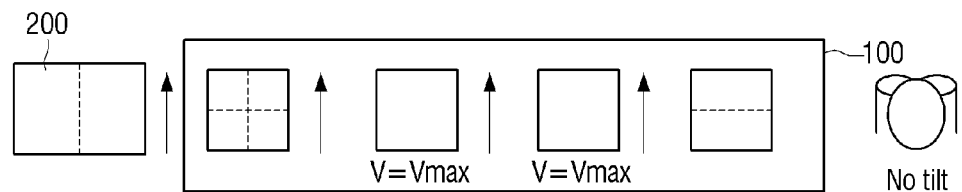
Figure 17C:
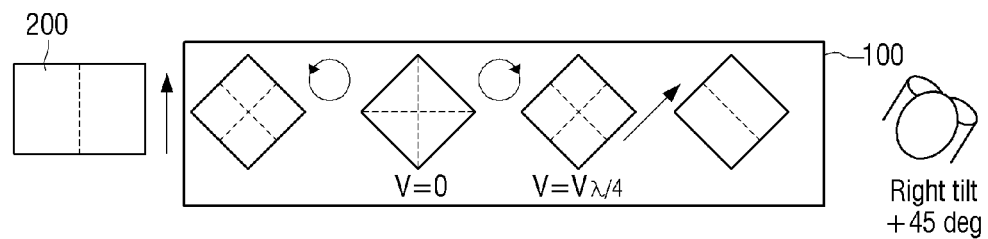

FIGS. 17A-17C are diagrams of the property change of the polarized image as the glass apparatus 100 is closed and tilted.

Figure 18A:
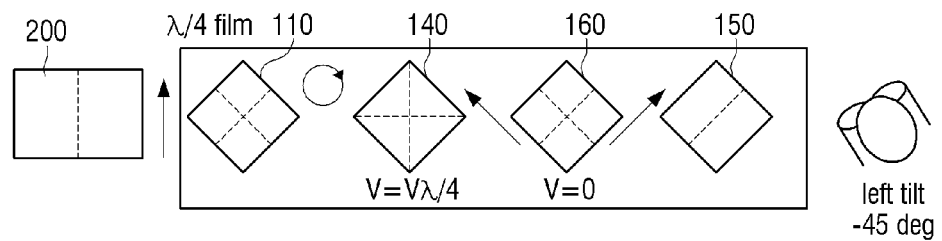
FIGS. 18A-18C are diagrams illustrating the polarization property change when the glass apparatus of FIG. 15 is opened and tilted.
Figure 18B:
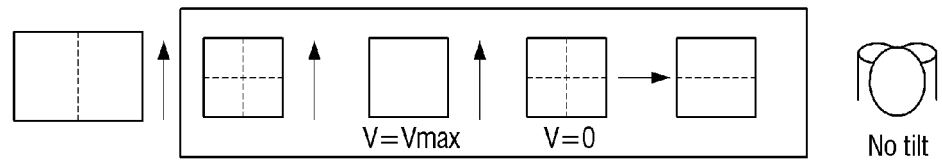

When the glass apparatus 100 is not tilted in FIGS. 17B and 18B, the polarized input image passes through the film unit 110 without affecting the polarization property, the maximum driving voltage is applied, and thus the polarizer 150 efficiently blocks the incident light, similarly to the single liquid crystal cell 140 as aforementioned.

When the glass apparatus 100 is tilted 45 degrees to the left as in FIGS. 17A and 17B, the liquid crystal cell (hereafter, referred to as a first liquid crystal cell 140) applies the maximum voltage, unlike the single liquid crystal cell 140 as aforementioned. When the maximum voltage is applied to the liquid crystal cell 140, the liquid crystal cell 140 passes the polarized image as it is and thus the polarized image is input to the second liquid crystal cell 160. The second liquid crystal cell 160 compensates for the phase difference by operating in the same manner as the single liquid crystal cell 140. Even when the glass apparatus 100 is tilted to the left, the polarized image is efficiently blocked.

Figure 18C:
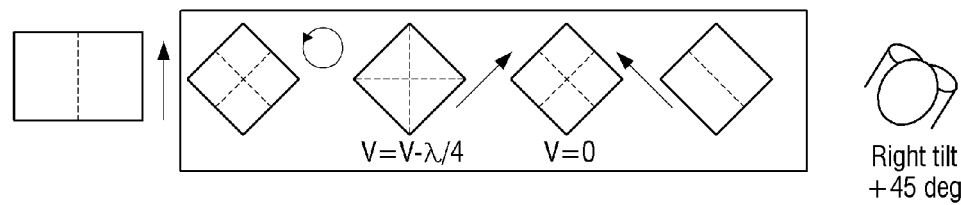

When the glass apparatus 100 is tilted 45 degrees to the right as shown in FIGS. 17C and 18C, the film unit 110 generates the circular polarization opposite to the left tilt. That is, the phase difference of the polarized image is 3λ/4. At this time, the first liquid crystal cell 140 merely converts the circular polarization to other circular polarization. That is, the phase difference is compensated by λ/2, rather than 3λ/4. The second liquid crystal cell 160 compensates for the other λ/4 and finally produces the linear polarization orthogonal to the polarization axis of the polarizer 150. The liquid crystal cell 140 effectively blocks the crosstalk by operating fast enough to block the incident light.

FIGS. 18A-18C are diagrams showing the property change of the polarized image when the glass apparatus 100 is opened and tilted.

As shown in FIG. 18B, when the glass apparatus 100 is not tilted, the first liquid crystal cell 140 can pass the polarized image by applying the maximum voltage and the second liquid crystal cell 160 can generate the phase difference λ/2 by applying no voltage. Conversely, the first liquid crystal cell 140 may apply no voltage and the second liquid crystal cell 160 may apply the maximum voltage.

When the glass apparatus 100 is tilted to the left as shown in FIG. 18A, the first liquid crystal cell 140 compensates for the phase difference λ/4 to produce the linear polarization, and the second liquid crystal cell 160 compensates for the phase difference λ/2 to align with the polarization axis of the polarizer 150. Likewise, the same result can be attained when the first liquid crystal cell 140 compensates for the phase difference λ/2 and the second liquid crystal cell 160 compensates for the phase difference λ/4. When the glass apparatus 100 is tilted to the right, only the direction is opposite and the same operations are applied.

In the light of the foregoing, exemplary embodiments provide the polarized shutter glass apparatus 100 for effectively blocking the flicker due to the lighting and effectively cancelling the crosstalk.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A glass apparatus for watching a polarized image, comprising:
   a film unit which double-refracts the polarized image when the glass apparatus is tilted;
   a sensor which detects a slope of the glass apparatus based on a horizontal plane;
   a voltage driver which applies a first driving voltage corresponding to the slope detected by the sensor, to a first liquid crystal cell;
   the first liquid crystal cell, which switches a first orientation according to the first driving voltage, and changes a polarization property of a birefringent image passing through the film unit according to the switched first orientation; and
   a polarizer which polarizes the birefringent image passing through the first liquid crystal cell in a polarization direction.

2. The glass apparatus of claim 1, wherein, when the glass apparatus is tilted, the film unit converts linear polarization to one of circular polarization and elliptical polarization by double-refracting the polarized image.

3. The glass apparatus of claim 1, wherein, when the glass apparatus is not tilted, the film unit passes the polarized image without double refraction.

4. The glass apparatus of claim 1, wherein the film unit is a retarder film of a quarter-wave film.

5. The glass apparatus of claim 4, wherein the film unit converts a linearly polarized image into circular polarization when the glass apparatus is tilted 45 degrees based on a horizontal plane, and converts the linearly polarized image into elliptical polarization when the glass apparatus is tilted at an angle between 0 degree and 45 degrees based on the horizontal plane.

6. The glass apparatus of claim 1, wherein the birefringent image passing through the film unit comprises a plurality of images, and a phase difference exists between the plurality of the images.

7. The glass apparatus of claim 1, wherein the polarized image is one of a 3-dimensional image, a multi-view image, and a 3-dimensional multi-view image.

8. The glass apparatus of claim 1, wherein the polarized image is one of a left-eye image and a right-eye image, and the left-eye image and the right-eye image have a same polarization direction.

9. The glass apparatus of claim 1, wherein the birefringent image passing through the film unit comprises a plurality of images, and
   the first liquid crystal cell changes a phase difference of the plurality of images by a first wavelength according to the first driving voltage.

10. The glass apparatus of claim 9, wherein, when the first driving voltage is zero, the first liquid crystal cell changes the phase difference of the plurality of the images by ½ wavelength,
    when the first driving voltage is zero and the birefringent image passing through the film unit is circularly polarized, the first liquid crystal cell reverses a direction of the circular polarization, and
    when the first driving voltage is zero and the birefringent image passing through the film unit is linearly polarized, the first liquid crystal cell aligns a polarization direction of the birefringent image with a polarization axis of the polarizer.

11. The glass apparatus of claim 9, wherein the first wavelength is preset.

12. The glass apparatus of claim 1, wherein the birefringent image passing through the film unit comprises a plurality of images, and
    when the first driving voltage is maximum, the first liquid crystal cell does not change a phase difference of the plurality of images.

13. The glass apparatus of claim 1, wherein, when the first driving voltage is zero and the birefringent image passing through the film unit is left-circularly polarized, the first liquid crystal cell converts the left-circular polarization to a right-circular polarization, and
    when the birefringent image passing through the film unit is right-circularly polarized, the first liquid crystal cell converts the right-circular polarization to the left-circular polarization.

14. The glass apparatus of claim 1, further comprising:
    a second liquid crystal cell which switches a second orientation according to a second driving voltage, and changes a polarization property of an image passing through the first liquid crystal cell according to the switched second orientation,
    wherein the voltage driver generates and applies the second driving voltage to the second liquid crystal cell.

15. The glass apparatus of claim 14, wherein the image passing through the first liquid crystal cell comprises a plurality of images, and
    the second liquid crystal cell changes a phase difference of the plurality of images by a wavelength according to the second driving voltage.

16. The glass apparatus of claim 15, wherein the wavelength is preset.

17. The glass apparatus of claim 14, wherein the image passing through the liquid crystal cell comprises a plurality of images,
    when the second driving voltage is zero, the second liquid crystal cell changes a phase difference of the plurality of the images by ½ wavelength,
    when the second driving voltage is zero and the image passing through the liquid crystal cell is circularly polarized, the second liquid crystal cell reverses a direction of the circular polarization, and
    when the second driving voltage is zero and the image passing through the liquid crystal cell is linearly polarized, the second liquid crystal cell aligns a polarization direction of the image with a polarization axis of the polarizer.

18. The glass apparatus of claim 14, wherein the image passing through the second liquid crystal cell comprises a plurality of images, and
    when the second driving voltage is maximum, the second liquid crystal cell does not change a phase difference of the plurality of images.

19. The glass apparatus of claim 14, wherein, when the driving voltage is zero and the image passing through the first liquid crystal cell is left-circularly polarized, the second liquid crystal cell converts the left-circular polarization to a right-circular polarization, and
    when the image passing through the first liquid crystal cell is right-circularly polarized, the second liquid crystal cell converts the right-circular polarization to the left-circular polarization.

20. The glass apparatus of claim 1, further comprising:
a controller which sets one of an open state and a closed state of the glass apparatus and controls the glass apparatus according to the open state and the closed state.

21. The glass apparatus of claim 20, wherein, when the glass apparatus is opened, the voltage driver applies a first driving voltage to the first liquid crystal cell according to a tilt of the glass apparatus so that a polarization direction of an image passing through the first liquid crystal cell is aligned with the polarizer, and
when the glass apparatus is closed, the voltage driver applies a second driving voltage to the first liquid crystal cell so that the polarization direction of the image passing through the first liquid crystal cell is vertical to the polarizer.

22. The glass apparatus of claim 1, wherein the liquid crystal cell is one of a twisted nematic (TN) Electrically Controllable Birefringence (ECB) cell and a TN Optically Compensated Bend (OCB) cell.

23. A glass apparatus, comprising:
a film unit which refracts an image when the glass apparatus is tilted;
a sensor which detects a slope of the glass apparatus based on a tilted angle;
a voltage driver which applies a driving voltage corresponding to the tilt angle detected by the sensor, to a liquid crystal cell;
the first liquid crystal cell, which switches an orientation of the image according to the driving voltage, and changes a polarization property of the image according to the switched first orientation; and
a polarizer which polarizes the image in a polarization direction.

24. The glass apparatus of claim 23, wherein, when the glass apparatus is tilted, the film unit converts linear polarization to one of circular polarization and elliptical polarization by double-refracting the image.

25. The glass apparatus of claim 23, wherein, when the glass apparatus is not tilted, the film unit passes the image without double refraction.

26. The glass apparatus of claim 23, wherein the film unit is a retarder film of a quarter-wave film.

27. The glass apparatus of claim 23, wherein the image passing through the film unit comprises a plurality of images, and a phase difference exists between the plurality of images.

28. The glass apparatus of claim 23, wherein the image is one of a 3-dimensional image, a multi-view image, and a 3-dimensional multi-view image.

29. The glass apparatus of claim 23, wherein the image is one of a left-eye image and a right-eye image, and
the left-eye image and the right-eye image have a same polarization direction.

* * * * *